US009555771B2

(12) United States Patent
Oohara (10) Patent No.: US 9,555,771 B2
(45) Date of Patent: Jan. 31, 2017

(54) ONBOARD DEVICE AND VEHICLE ANTI-THEFT SYSTEM

(71) Applicant: DENSO CORPORATION, Kariya, Aichi-pref. (JP)

(72) Inventor: Katsuhiro Oohara, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/435,374

(22) PCT Filed: Sep. 27, 2013

(86) PCT No.: PCT/JP2013/005758
§ 371 (c)(1),
(2) Date: Apr. 13, 2015

(87) PCT Pub. No.: WO2014/061209
PCT Pub. Date: Apr. 24, 2014

(65) Prior Publication Data
US 2015/0266451 A1    Sep. 24, 2015

(30) Foreign Application Priority Data
Oct. 17, 2012  (JP) ................................ 2012-229738

(51) Int. Cl.
*B60R 25/24*    (2013.01)
(52) U.S. Cl.
CPC ..................................... *B60R 25/24* (2013.01)
(58) Field of Classification Search
CPC ............................... B60R 25/24; B60R 25/245
See application file for complete search history.

(56) References Cited

U.S. PATENT DOCUMENTS 5,467,070 A *  11/1995  Drori ...................... B60R 25/04
                                                           340/425.5
2008/0244757 A1*  10/2008  Nakagaki ................ B60R 25/00
                                                           726/28

(Continued)

FOREIGN PATENT DOCUMENTS

JP    2007030613 A    2/2007
JP    4593520 B2    12/2010

(Continued)

OTHER PUBLICATIONS

International Search Report and Written Opinion (in Japanese with English Translation) for PCT/JP2013/005758, mailed Nov. 5, 2013; ISA/JP.

(Continued)

*Primary Examiner* — Todd Melton
*Assistant Examiner* — Jason Roberson
(74) *Attorney, Agent, or Firm* — Harness, Dickey & Pierce, P.L.C.

(57) ABSTRACT

This onboard device measures the received power of radio waves transmitted from a base station while the engine is running and sets a near-out-of-range flag when the level of the received power has become equal to or lower than a near-out-of-range level, which indicates the possibility of going out of range. The onboard device permits a portable terminal device to obtain a new effective period for a key ID when the radio wave environment of a vehicle when the engine is stopped indicates that the vehicle is out of range, and the effective period of the key ID has expired and needs to be renewed, provided that the near-out-of-range flag has been set. Consequently, security can be enhanced during acquisition of update information for the key information with the portable terminal device.

10 Claims, 5 Drawing Sheets

(56) References Cited

U.S. PATENT DOCUMENTS

2009/0195370 A1* 8/2009 Huffman ................ B60R 25/04
340/426.13
2011/0193721 A1 8/2011 Koie et al.

FOREIGN PATENT DOCUMENTS

| JP | 2011074721 A | 4/2011 |
| JP | 2011187040 A | 9/2011 |

OTHER PUBLICATIONS

Susumu Miwa and Satoshi Kouya, "Analysis of the fading characteristics in mobile communication", Dept. of Information and Communication Engineering, College of Engineering Tokyo Denki University, Annual Report, Research Institute for Technology, No. 20 Tokyo Denki University, pp. 161-166.

* cited by examiner

ONBOARD DEVICE AND VEHICLE ANTI-THEFT SYSTEM

CROSS REFERENCE TO RELATED APPLICATIONS

This application is a U.S. National Phase Application under 35 U.S.C. 371 of International Application No. PCT/JP2013/005758 filed on Sep. 27, 2013 and published in Japanese as WO 2014/061209 A1 on Apr. 24, 2014. This application is based on and claims the benefit of priority from Japanese Patent Application No. 2012-229738 filed on Oct. 17, 2012. The entire disclosures of all of the above applications are incorporated herein by reference.

TECHNICAL FIELD

The present disclosure relates to an onboard device and a vehicle anti-theft system to perform collation control of key information.

BACKGROUND ART

An immobilizer is used as one of vehicle anti-theft devices. The immobilizer provides wireless communication between an onboard device and an electronic key (mobile device) that stores a key ID unique to each vehicle.

The immobilizer collates a key ID received from the electronic key with a key ID stored in the onboard device and allows an engine to start only when both key IDs match.

A system that provides an expiration date to authenticate the key ID (see patent literature 1) in a case where the electronic key is stolen or duplicated is proposed. In order to update the expiration date, the onboard device used in the system periodically communicates with a server managing the expiration date with an onboard communication device and receives authentication from the server.

However, the expiration date may pass when a user parks the vehicle outside range to be incapable of connection to a mobile communication network. In this case, the onboard device cannot communicate with the server using the onboard communication device, and therefore the onboard device cannot update the expiration date. To be prepared for this case, the system allows a registered mobile terminal device owned by the user to be used an alternative device to the onboard communication device. The user owning the mobile terminal device moves to an area capable of connection to the mobile communication network, receives update information from the server, returns to the vehicle, and transmits the update information to the onboard device to update the expiration date.

PRIOR ART LITERATURE

Patent Literature

Patent Literature 1: JP 2011-74721 A

SUMMARY OF INVENTION

Recently, an onboard device (vehicle anti-theft devices) that transmits a vehicle position to the server or a user's mobile terminal device and keeps track of the vehicle position when the vehicle is subject to an anomaly such as theft is put in a practical use. According to this onboard device, even in case of theft, this onboard device can easily specify the vehicle position as far as the vehicle remains in an area capable of connection to the mobile communication network. A person who intends to steal the vehicle may destroy a mobile communication antenna mounted on a vehicle roof to disable the capability of specifying or keeping track of the vehicle position.

The system described in patent literature 1 actively uses the registered mobile terminal device as an alternative device when the antenna is destroyed to disable the onboard communication device from connecting with the mobile communication network and cause the authentication expiration date to pass. There is a possibility that a person who intends to steal the vehicle beforehand obtains the registered mobile terminal device owned by the user or duplicates the SIM card mounted on the mobile terminal device. This enables to intentionally create a situation where the onboard communication device cannot connect to the mobile communication network, and update the expiration date using the mobile terminal device. Updating the expiration date enables the vehicle to travel until the expiration date passes while disabling the capability of specifying or keeping track of the vehicle position. A security difficulty occurs when the mobile terminal device is used as an alternative device only since the onboard communication device cannot connect with the mobile communication network The present disclosure has been made in consideration of the foregoing. It is an object of the disclosure to provide an onboard device and an vehicle anti-theft system in order to enhance security in acquisition of update information about key information using a mobile terminal device.

According to an embodiment of the disclosure, an onboard device includes a communication portion, a short range communication portion, and a collation control portion. The communication portion communicates with a server through a mobile communication network. The short range communication portion performs short range communication with a previously registered mobile terminal device communicable with the server through the mobile communication network. The collation control portion stores key information that needs to be updated every expiration date. The collation control portion gives start permission in order to change a power unit of a vehicle from a stopped state to an operating state on a condition that the received key information and the stored key information are collated to satisfy a specified match and that the key information satisfies an expiration date. While the power unit stops, the onboard device may need to update the key information inside range capable of communication between the communication portion and a base station of the mobile communication network. In such case, the onboard device receives key information update information to update the key information.

The communication portion includes a function to measure received power of a radio wave transmitted from the base station for the mobile communication network. The collation control portion sets an outside-range approach flag when the received power measured by the communication portion goes lower than or equal to a near-marginal level during operation of the power unit. The collation control portion resets the outside-range approach flag when the received power goes higher than the near-marginal level. The near-marginal level is set higher than a marginal level by a specified permissible value. The marginal level enables communication with a base station of the mobile communication network.

While the power unit stops, the vehicle may be positioned outside range incapable of communication between the communication portion and the base station of the mobile communication network. In such case, the received power measured by the communication portion should decrease to be lower than or equal to the near-marginal level and the outside-range approach flag should be set while the power unit operates before the power unit stops. By contrast, The outside-range approach flag remains reset when a person who intends to steal the vehicle parked in the inside-range area and destroys the antenna to disable the capability of specifying or keeping track of the vehicle position. The inside-range area enables communication with the base station of the mobile communication network.

The collation control portion permits the mobile terminal device to communicate with the server and acquire key information update information on condition that the outside-range approach flag is set when the key information needs to be updated after positioned outside range while the power unit stops. After the mobile terminal device acquires the update information, the collation control portion receives the update information acquired from the mobile terminal device through the short range communication portion and updates the key information.

When the key information is updated, the onboard device enables to intentionally create a situation of being outside range to disable the communication portion from communicating with the base station of the mobile communication network, prevent an unauthorized attempt to allow the mobile terminal device to acquire the expiration date, and enhance the security.

For example, the onboard device according to the embodiment can be used as a vehicle anti-theft system including a server and a mobile terminal device. In this case, the server is connected to the mobile communication network. The onboard device can communicate with the server through the mobile communication network. The mobile terminal device is in advance registered to be capable of communication with the server through the mobile communication network and capable of short range communication with the onboard device. In the vehicle anti-theft system, the onboard device may permit the mobile terminal device to communicate with the server and acquire key information update information. In such case, the mobile terminal device receives the key information update information from the server when positioned inside range to enable communication with the base station of the mobile communication network. The mobile terminal device then transmits the key information update information to the onboard device.

BRIEF DESCRIPTION OF DRAWINGS

The foregoing and other advantages and features of the disclosure will become more apparent from the detailed description of the preferred embodiments of the disclosure given below with reference to the accompanying drawings in which.

PREFERRED EMBODIMENTS FOR CARRYING OUT THE INVENTION

Figure 1:
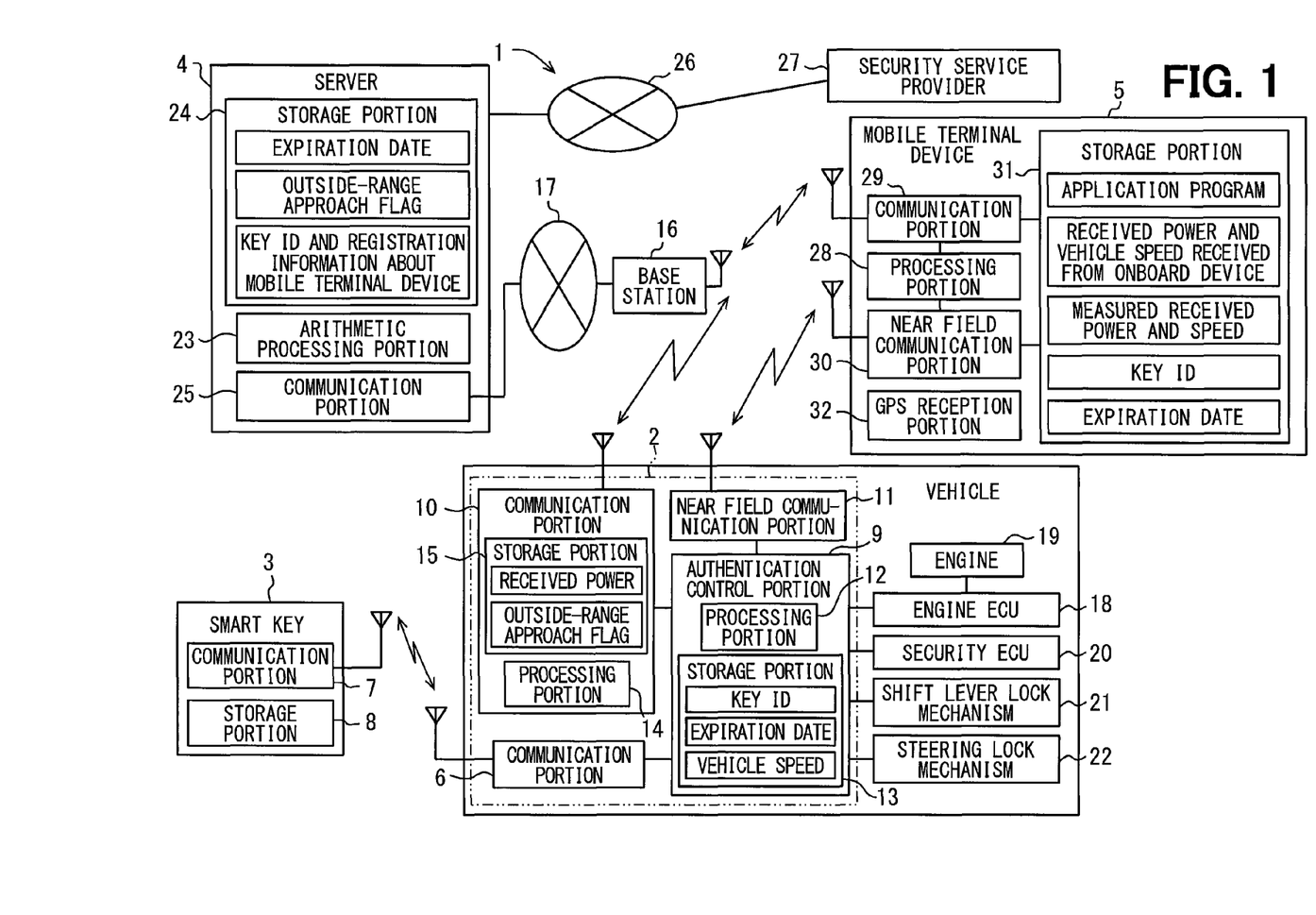
FIG. 1 is a diagram illustrating a vehicle anti-theft system according to an embodiment of the present disclosure.

An embodiment of the present disclosure will be described in detail with reference to the accompanying drawings. As illustrated in FIG. 1, a vehicle anti-theft system 1 includes an onboard device 2, a smart key (a mobile device) 3, a server 4 installed at a management center, and a previously registered mobile terminal device 5. The onboard device 2 functions as a smart entry and an immobilizer and intermittently transmits a request signal from a communication portion 6. The smart key 3 includes a communication portion 7 and a storage portion 8, which stores a key ID. When receiving the request key, the smart key 3 transmits the key ID.

In addition to the communication portion 6, the onboard device 2 includes a collation control portion 9, a communication portion 10 to communicate with the server 4, and a short range communication portion 11 to perform short range communication with the mobile terminal device 5. The collation control portion 9 provides an ECU (Electronic Control Unit) mainly configured as a microcomputer including a processing portion 12 (a CPU) and a storage portion 13 (a memory). The storage portion 13 includes an electrically rewritable non-volatile memory (EEPROM or a flash memory) that stores authorized key information such as a key ID and expiration date to authenticate the key ID. The storage portion 13 includes RAM that stores vehicle speed data.

The communication portion 10 includes a communication processing portion 14 and a storage portion 15. The communication processing portion 14 connects with a mobile communication network 17 such as a mobile telephone network through a base station 16. The communication processing portion 14 measures received power of a radio wave transmitted from the base station 16 and stores the received power in the storage portion 15. The storage portion 15 allows the RAM to store the measured received power and an outside-range approach flag, which is described later. The short range communication portion 11 performs short range communication based on short range communication standards such as Bluetooth (registered trademark) and Wi-Fi (registered trademark). The collation control portion 9 is directly connected to the short range communication portion 11, but may be connected to the short range communication portion 11 through the communication portion 10.

A vehicle includes an engine ECU 18, a security ECU 20, a shift lever lock mechanism 21, and a steering lock mechanism 22, or the like. The collation control portion 9 is connected to the engine ECU 18 and the security ECU 20 through an onboard network. The engine ECU 18 controls an engine 19 as a power unit. The security ECU 20 provides a security device to compare signals from a shock sensor, an acceleration sensor, a sound pressure sensor, a pyroelectric sensor, and an infrared sensor with threshold values and thereby detect intrusions into the vehicle that may be caused by breaking a window or other methods. The shift lever lock mechanism 21 mechanically locks shift positions of a shift lever. The steering lock mechanism 22 locks a steering wheel.

The server 4 installed at the management center is provided as a computer system including an arithmetic processing portion 23, a storage portion 24, and a communication portion 25. The arithmetic processing portion 23 mainly includes a CPU. The storage portion 24 stores a key ID, registration information about the mobile terminal device 5, an expiration date (update information) with respect to the key ID authentication, and the outside-range approach flag received from the onboard device 2. The communication portion 25 is connected to the mobile communication network 17. When detecting a vehicle anomaly, the server 4 notifies the anomaly to a security service provider 27 through an internet 26 (or the mobile communication network 17).

A user to drive the vehicle carries the mobile terminal device 5 that is registered to the server 4 in advance. The mobile terminal device 5 corresponds to a mobile telephone, a PHS, a personal digital assistance (PDA), a smartphone, or the like. The mobile terminal device 5 includes a processing portion 28, a communication portion 29, a short range communication portion 30, a storage portion 31, and a GPS reception portion 32. The processing portion 28 is supplied with position data from the GPS reception portion 32 and measures a movement speed of the mobile terminal device 5. The processing portion 28 may not be able to receive a radio wave transmitted from a GPS satellite. In this case, the processing portion 28 measures a movement speed using a gyro sensor or an acceleration sensor (unshown). The storage portion 31 stores the measured travel speed.

The communication portion 29 connects to the mobile communication network 17 through the base station 16. The communication portion 29 measures the received power of a radio wave transmitted from the base station 16. The onboard device 2 and the mobile terminal device 5 connect to the same mobile communication network 17. The short range communication portion 30 performs short range communication with the onboard device 2 based on the short range communication standards. The storage portion 31 stores various application programs, data including the received power and the vehicle speed received from the onboard device, data including the received power and the movement speed measured by the mobile terminal device 5, key information such as a key ID, and an expiration date for the key ID received from the server.

Figure 2:
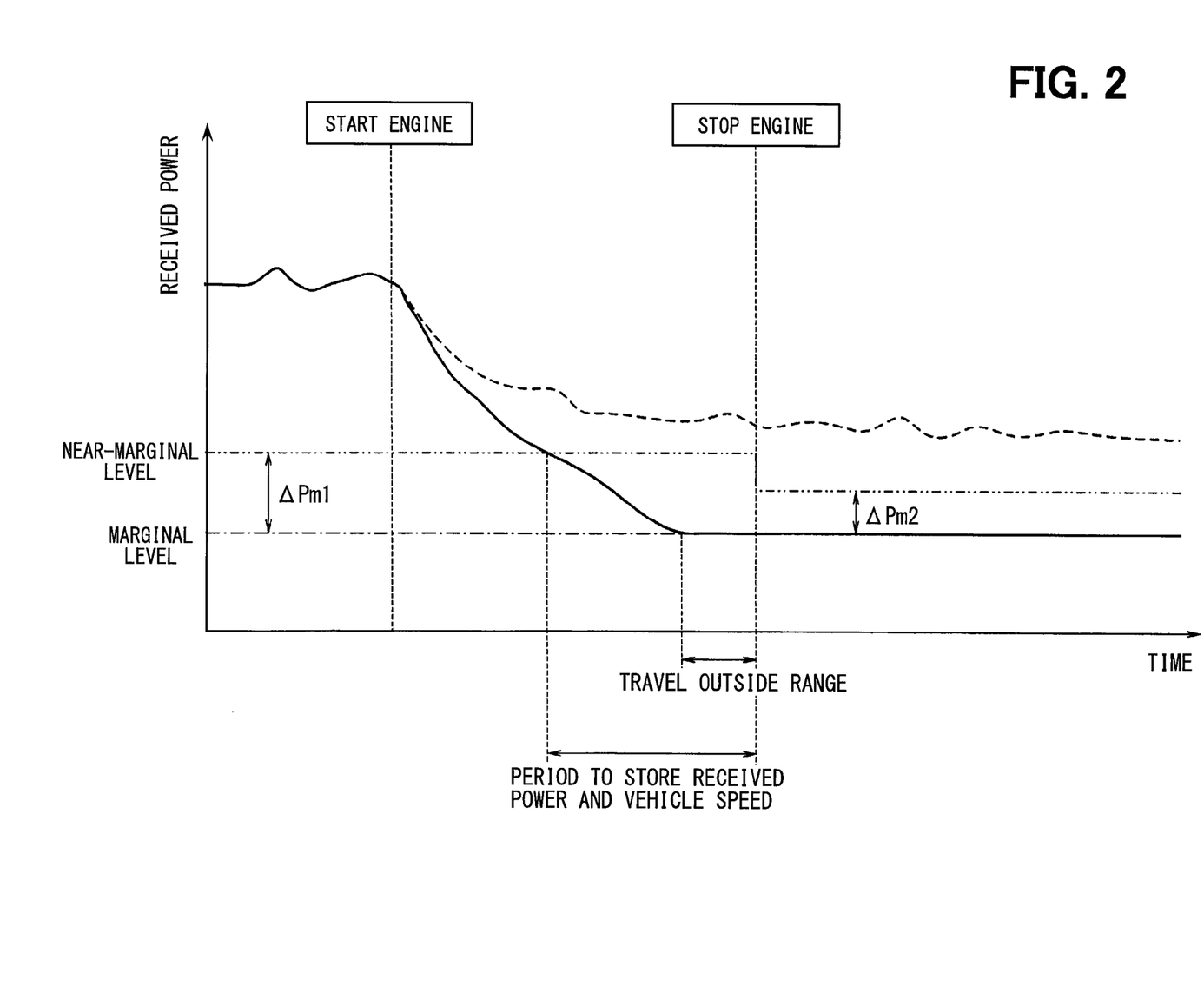
FIG. 2 is a diagram illustrating received power measured by a communication portion of an onboard device.

Effects of the present embodiment will be described with reference to FIG. 2 through FIG. 5. In the following description, the condition of being in an inside range will be referred to as an area enabling communication or a state enabling communication with the base station 16 of the mobile communication network 17. The condition of being in an outside range will be referred to as an area disabling communication or a state disabling communication such as a mountain area, an underground parking, or a broken antenna. FIG. 2 illustrates the received power measured in the communication portion 10. FIG. 2 illustrates the received power (a solid line) when a vehicle parked inside range starts the engine, the vehicle travels to the outside range, and the vehicle stops the engine in the outside range. FIG. 2 illustrates the received power (a broken line) when the engine is stopped in the inside range.

A marginal level illustrated in a dash-dot line denotes a minimum received power level required for communication with the base station 16 in the mobile communication network, namely, a threshold value level of the received power to cause the condition of being in the outside range. The received power varies with changes in the radio field strength due to travel or the radio wave interference due to reflection or diffraction resulting from buildings or geological formation. While the vehicle travels, the received power varies due to the former and the latter. While the vehicle stops, the received power varies with the latter.

In consideration of the variations, a near-marginal level illustrated in a dash-double dot line is set to a level higher than the level causing a possibility of being in the outside range, namely, a level higher than the marginal level by predetermined permissible value ΔPm1 or ΔPm2. Because of the above-mentioned variation causes, permissible value ΔPm1 applicable to the traveling vehicle is larger than permissible value ΔPm2 applicable to the stopped vehicle. The communication processing portion 14 cannot accurately measure the received power lower than the marginal level. Therefore, a measured value is clamped to the marginal level and is output when the received power is lower than the marginal level. For this reason, FIG. 2 illustrates the received power so that it does not go below the marginal level.

Figure 3:
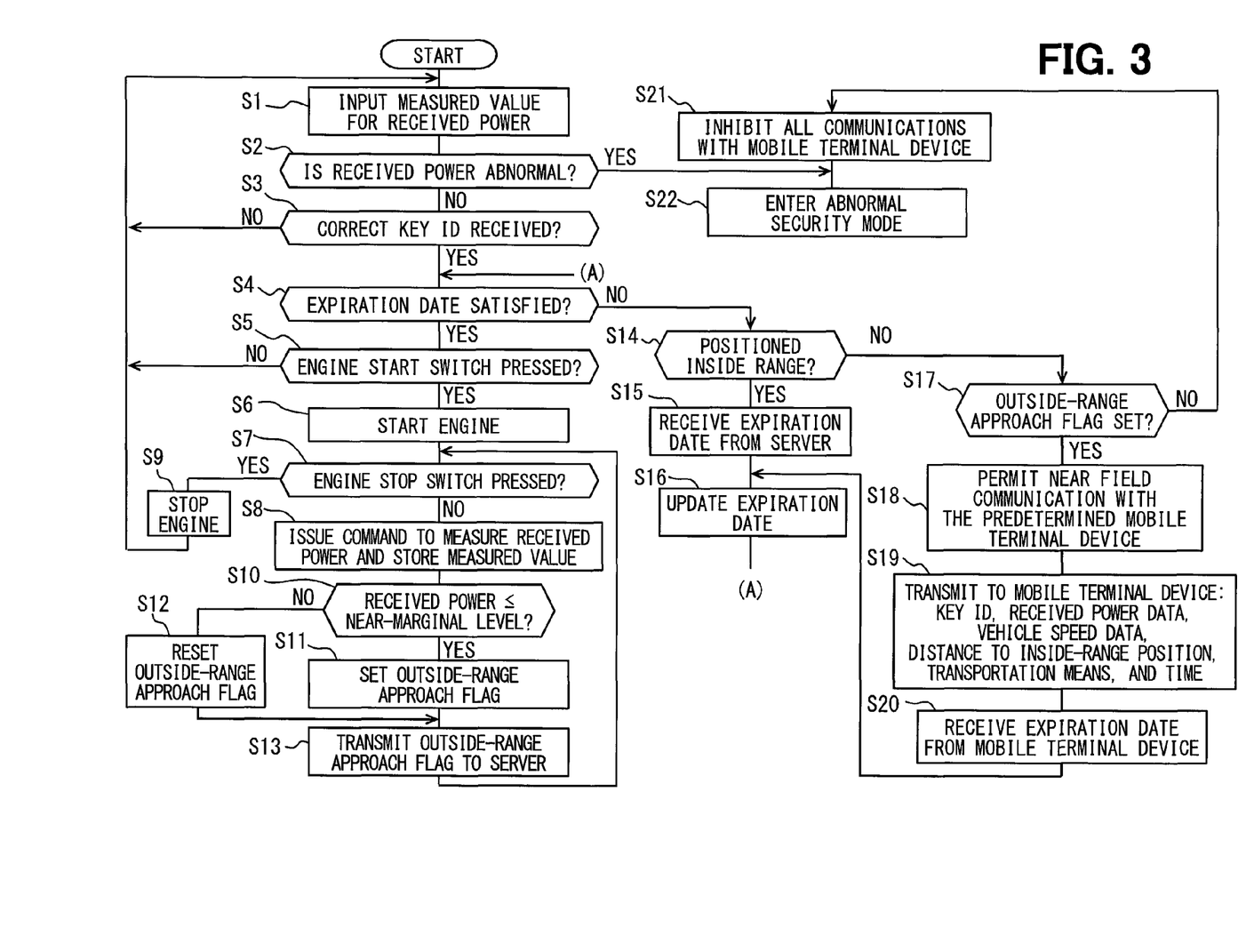
FIG. 3 is a flowchart illustrating a process performed by a collation control portion of the onboard device.

According to the flowchart illustrated in FIG. 3, the collation control portion 9 of the onboard device 2 performs the function as an immobilizer. The smart entry function to lock or unlock a door is omitted. According to the flowchart illustrated in FIG. 4, the mobile terminal device 5 acquires the expiration date for the key ID from the server 4 instead of the onboard device 2 and transmits the expiration date to the onboard device 2. According to the flowchart illustrated in FIG. 5, the server 4 manages the expiration date for the key ID. The key ID and the expiration date to authenticate the key ID correspond to the key information. A new expiration date for the key ID corresponds to key information update information.

The processing portion 12 of the collation control portion 9 performs the process at S1 through S6 and S14 through S22 while the engine (the power unit) stops. The processing portion 12 of the collation control portion 9 performs the process at S7 through S13 while the engine operates. The processing portion 12 receives a measured value for the received power from the communication portion 10 at S1 and determines at S2 whether or not the received power is abnormal. The received power measured at this point is not stored in the storage portion 15.

The received power when the vehicle stops does not exceed a fluctuation range (the permissible value ΔPm2) due to the radio wave interference or the like. Therefore, it is determined that the received power is abnormal when the received power for the stopped vehicle is decreased from a value higher than the near-marginal level to a value equal to or lower than the marginal level and when the received power for the stopped vehicle is increased from a value equal to or lower than the marginal level to a value higher than the near-marginal level.

As an example of the former, an onboard antenna may be destroyed. As an example of the latter, a strong electromagnetic wave may be applied to the onboard antenna to interfere (mask) a radio wave received from the base station 16. Recently, the number of a vehicle anti-theft device that automatically transmits a vehicle position to the server 4 or the user's mobile terminal device 5 increases. Accordingly, a person who intends to steal the vehicle is supposed to often disconnect the onboard device 2 from the mobile communication network 17 to escape from a specifying of a vehicle position or a chase.

When determining that the received power is abnormal (S2: YES), the processing portion 12 assumes a high security risk and proceeds to S22 to enter an abnormal security mode. The process stops at this point. Only the use of a maintenance tool possessed by an authorize dealer can exit from the abnormal security mode.

In the abnormal security mode, the processing portion 12 commands the security ECU 20 to decrease threshold values (to increase sensitivity) for the shock sensor, the acceleration sensor, the sound pressure sensor, the pyroelectric sensor, the infrared sensor, or the like. Consequently, the security ECU 20 may detect intrusion into the vehicle in response to a shock or the like smaller than a shock in a normal security mode. The security ECU 20 also commands the shift lever lock mechanism 21 and the steering lock mechanism 22 to lock the shift lever and the steering wheel. Consequently, even when a person intrudes into the vehicle, the person can hardly drive the vehicle to move the vehicle.

When determining at S2 that the received power is normal (S2: NO), the processing portion 12 proceeds to S3 and collates the key ID received from the smart key 3 through the communication portion 6 with the authorized key ID stored in the storage portion 13. The processing portion 12 returns to S1 when the key ID is not received or the key IDs mismatch. The processing portion 12 proceeds to S4 when the key IDs match, namely, a specified match is made.

The expiration date is provided to authenticate the key ID in case that the smart key is stolen or duplicated. The key ID expiration date corresponds to one of the key information and is set to 24 hours from the most recent update, for example. When the key ID expiration date passes, the engine 19 cannot start until the expiration date is updated. At S4, the processing portion 12 determines whether or not the key ID satisfies the expiration date based on the expiration date stored in the storage portion 13. The processing portion 12 proceeds to S5 when the key ID satisfies the expiration date. A process to be performed when the expiration date passes will be described later.

An engine starter is provided near a driver's seat of the vehicle. The engine starter can command the engine 19 to start or stop when a user presses a push switch while stepping on a brake pedal. At S5, the processing portion 12 determines whether or not an engine start switch is pressed. When the engine start switch is pressed, the processing portion 12 proceeds to S6 and commands the engine ECU to start the engine 19. When the engine start switch is not pressed, the processing portion 12 returns to S1.

When the engine 19 starts, the processing portion 12 repeats the process from S7 through S13 until an engine stop switch is pressed. When determining at S7 that the engine stop switch is pressed, the processing portion 12 proceeds to S9, commands the engine 19 to stop, and returns to S1. When determining at S7 that the engine stop switch is not pressed, the processing portion 12 proceeds to S8 and commands the communication portion 10 to measure the received power and to store the measured value.

At S10, the processing portion 12 determines whether or not the received power received from the communication portion 10 is lower than or equal to the near-marginal level. When the received power is lower than or equal to the near-marginal level, the processing portion 12 proceeds to S11 and sets the outside-range approach flag. When the received power is higher than the near-marginal level, the processing portion 12 proceeds to S12 and resets the outside-range approach flag. The outside-range approach flag is stored in the storage portion 15 of the communication portion 10. When the outside-range approach flag changes between the set state and the reset state, the processing portion 12 allows the communication portion 10 to transmit the outside-range approach flag to the server 4. The processing portion 12 returns to S7.

The key ID expiration date may have passed at S4. In this case, the processing portion 12 proceeds to S14 when the key ID expiration date is expired, and determines whether or not the vehicle is positioned in the inside range, which is capable of communication with the server 4 through the mobile communication network 17. When the vehicle is positioned in the inside range, the processing portion 12 proceeds to S15 and communicates with the server 4 to receive a new expiration date. At S16, the processing portion 12 updates the expiration date stored in the storage portion 13. The processing portion 12 then returns to S4, determines that the key ID satisfies the expiration date, and proceeds to S5.

The vehicle may be positioned in the outside range, which is disable communication with the server 4. In this case, the processing portion 12 proceeds to S17 and determines whether or not the outside-range approach flag stored in the storage portion 15 is set. When the vehicle is positioned in the outside range while the engine 19 stops, the received power measured in the communication portion 10 should decrease to be lower than or equal to the near-marginal level and the outside-range approach flag should be set while the vehicle travels before the engine 19 stops. The outside-range approach flag is set or reset only when the engine 19 rotates. The outside-range approach flag remains reset when a person who intends to steal the vehicle parked in the inside range destroys the antenna to escape the specifying of the position or the chase.

When the outside-range approach flag is not set (S17: NO), the processing portion 12 assumes the high security risk and proceeds to S21 to inhibit all communications with the mobile terminal device 5. The processing portion 12 then proceeds to S22 and enters the abnormal security mode.

When the outside-range approach flag is set (S17: YES), the processing portion 12 proceeds to S18 to permit communication with the previously registered mobile terminal device 5. At S19, the processing portion 12 calculates a distance the vehicle traveled in the outside-range area before the engine 19 stops. The distance is equal to distance from the current outside-range position to an inside-range position along the vehicle's travel route. To find the distance to the inside-range position, the processing portion 12 reads the received power stored in the storage portion 15 and the vehicle speed stored in the storage portion 13 and integrates the vehicle speed during a period where the received power is lower than or equal to the marginal level.

To prevent the mobile terminal device 5 from easily acquiring the key ID expiration date from the server 4, the processing portion 12 specifies a transportation form to move from the current position until positioned in the inside range and/or the minimal required time needed for the moving. For example, it is supposed that the distance to an inside-range position is 2 km or shorter. In this case, the processing portion 12 specifies walking as the transportation form and finds the minimal required time to travel the distance by walking. When the distance exceeds 2 km, the processing portion 12 does not specify the transportation form for an authorized user's convenience and specifies the minimal required time instead. The processing portion 12 uses the short range communication to transmit the key ID, the received power data, vehicle speed data, the distance to the inside-range position, the transportation form, and the minimal required time to the mobile terminal device 5.

Subsequently, the user carrying the mobile terminal device 5 returns to an inside-range position, allows the mobile terminal device 5 to acquire a new expiration date for the key ID from the server 4, and then returns to the vehicle again. Meanwhile, at S20, the processing portion 12 waits for the new expiration date from the mobile terminal device 5. On completion of the reception, the processing portion 12 returns to S16 and updates the expiration date in the storage portion 13.

Figure 4:
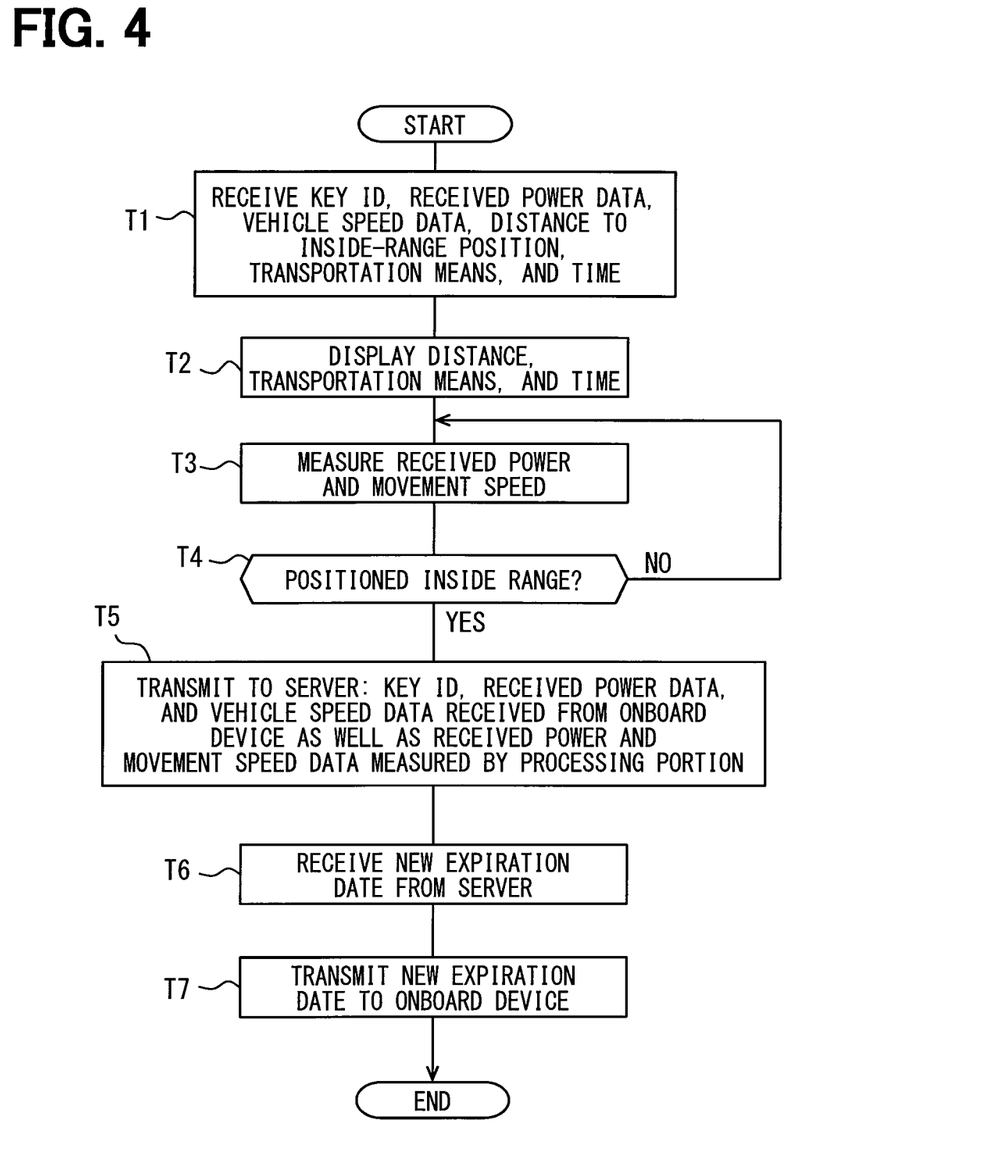
FIG. 4 is a flowchart illustrating a process performed by a mobile terminal device.

With reference to FIG. 4, the process performed by the processing portion 28 of the mobile terminal device 5 will be described. At T1, the short range communication portion 30 of the mobile terminal device 5 performs short range communication with the short range communication portion 11 of the onboard device 2. The processing portion 28 receives the key ID, the received power data and the vehicle speed data measured by the onboard device 2, the distance to the inside-range position calculated by the onboard device 2, the transportation form, and the minimal required time.

At T2, the processing portion 28 allows a display of the mobile terminal device 5 to display all or part of the received distance, the transportation form, and the minimal required time. When walking is specified as the transportation form, the mobile terminal device 5 displays, for example, "2 km (approximately 30 minutes) to the inside-range area from here. Walk down the traveled route back to the inside-range area. Receive the update information from the center, and then return to the vehicle again." When no transportation form is specified, the mobile terminal device 5 displays, for example, "10 km to the inside-range area from here. Return to the inside-range area along the traveled route in 30 minutes or more. Receive the update information from the center, and then return to the vehicle again."

Until the mobile terminal device 5 reaches the inside-range position, the processing portion 28 proceeds to T3 and commands the communication portion 29 to measure the received power. The processing portion 28 is also supplied with position data from the GPS reception portion 32 and measures the movement speed of the mobile terminal device 5. These measured values are stored in the storage portion 31. When determining at T4 that the inside-range position is reached, the processing portion 28 proceeds to T5 and transmits the key ID, the received power data, and the vehicle speed data received from the onboard device 2 as well as the received power data and the movement speed data measured by the processing portion 28 to the server through the mobile communication network 17. At T6, the processing portion 28 receives a new expiration date (update information) from the server 4. When the user returns to the vehicle, the processing portion 28 proceeds to T7 and transmits the new expiration date to the onboard device 2.

Figure 5:
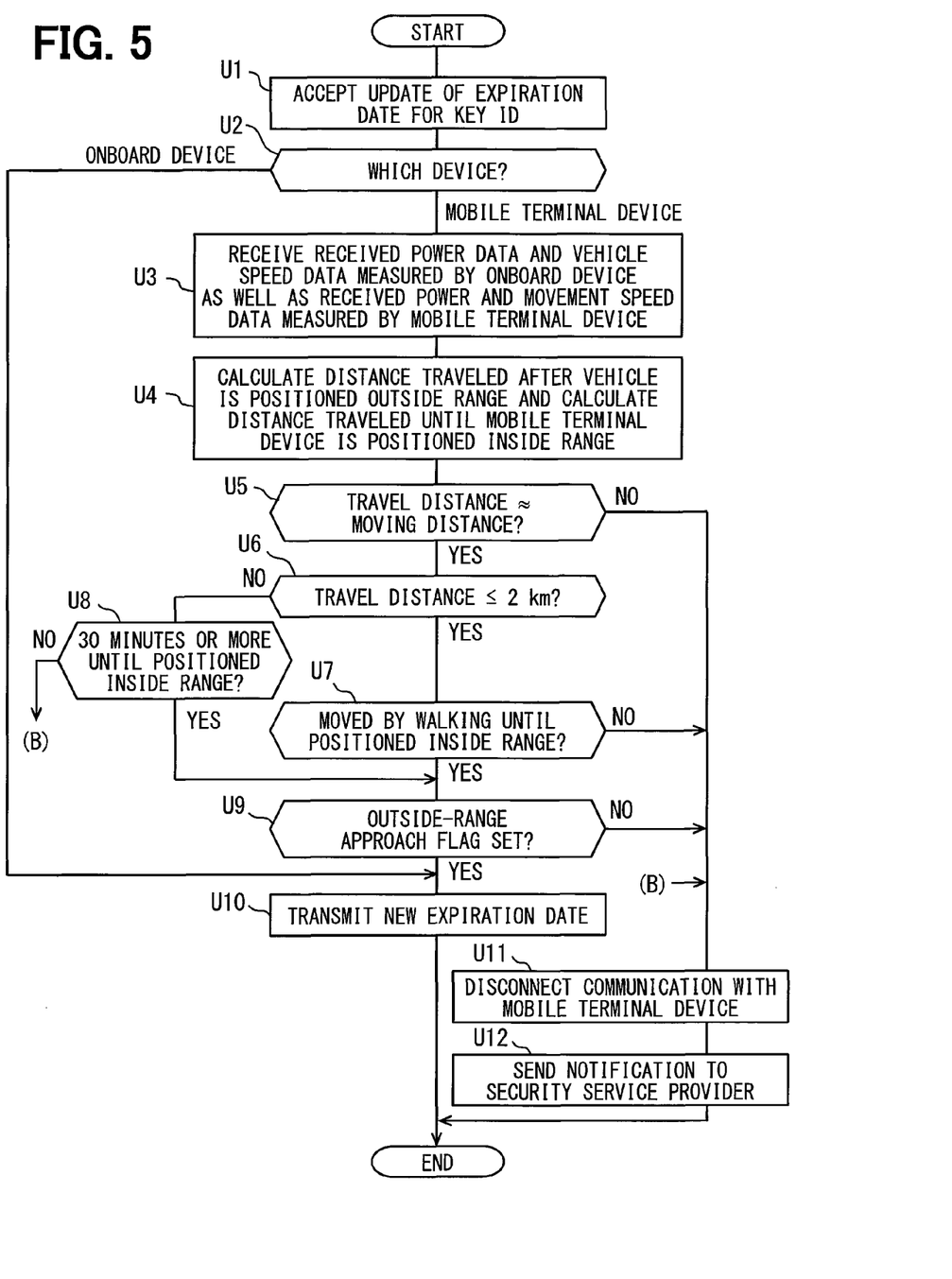
FIG. 5 is a flowchart illustrating a process performed by a server.

With reference to FIG. 5, the process performed by the arithmetic processing portion 23 of the server 4 will be described. At U1, the communication portion 25 receives the key ID through the mobile communication network 17. The arithmetic processing portion 23 references the key ID stored in the storage portion 24 and registration information about the mobile terminal device 5. The arithmetic processing portion 23 confirms that the key ID and the mobile terminal device 5 are registered. After the confirmation, the arithmetic processing portion 23 accepts the update of the expiration date for the key ID.

At U2, the arithmetic processing portion 23 determines which device transmitted the request to update the key ID. When determining that the onboard device 2 transmitted the request, the arithmetic processing portion 23 skips the process at U3 through U9 to be described below and immediately transmits a new expiration date to the onboard device 2. When determining that the mobile terminal device 5 transmitted the request, the arithmetic processing portion 23 proceeds to U3 and receives the received power data and the vehicle speed data measured by the onboard device 2 as well as the received power data and the movement speed data measured by the mobile terminal device 5. At U4, based on the received data, the arithmetic processing portion 23 calculates a distance traveled after the vehicle is positioned in the outside range until the engine 19 stops. The arithmetic processing portion 23 also calculates a distance traveled until the mobile terminal device 5 (i.e., the user) moves to be positioned in the inside range.

At U5, when the arithmetic processing portion 23 determines that the calculated travel distance approximately equals the calculated moving distance (the difference is smaller than or equal to an allowable value), the arithmetic processing portion 23 proceeds to U6. The arithmetic processing portion 23 assumes the update to be invalid when the difference is determined to exceed the allowable value. At U6, the arithmetic processing portion 23 determines whether or not the vehicle travels 2 km or less after the vehicle is positioned in the outside range. When the vehicle travels 2 km or less (U6: YES), the onboard device 2 specifies the transportation by walking. The arithmetic processing portion 23 proceeds to U7 and determines whether or not an average movement speed of the mobile terminal device 5 is evaluated as the transportation by walking (for example, 5 km/h or less). The arithmetic processing portion 23 assumes the update to be invalid when the average movement speed is not evaluated as the transportation by walking.

The arithmetic processing portion 23 proceeds to U8 when the vehicle travels more than 2 km after the vehicle is positioned in the outside range. At U8, the arithmetic processing portion 23 determines whether or not the minimal required time (30 minutes) or more has elapsed after the mobile terminal device 5 accepts the permission from the onboard device 2 until the mobile terminal device 5 starts communicating with the server 4. The arithmetic processing portion 23 assumes the update to be invalid when the elapsed time is less than the minimal required time.

The server 4 uses a routine different from the process routine to receive the outside-range approach flag (referring to S13) transmitted from the onboard device 2 and store the outside-range approach flag in the storage portion 24. At U9, the arithmetic processing portion 23 determines whether or not the outside-range approach flag of the onboard device 2 is set. This process corresponds to the confirmation at S17 in FIG. 3 for the same purpose. The arithmetic processing portion 23 assumes the update to be invalid when the outside-range approach flag is set.

The arithmetic processing portion 23 assumes the update to be valid when the conditions at U5, U7, U8, and U9 are satisfied (U5, U7, U8, and U9: YES). The arithmetic processing portion 23 transmits a new expiration date to the mobile terminal device 5. The arithmetic processing portion 23 assumes the update to be invalid when the conditions at U5, U7, U8, and U9 are not satisfied (U5, U7, U8, and U9: NO). In this case, the arithmetic processing portion 23 proceeds to U11 and disconnects the communication with the mobile terminal device 5. At U12, the arithmetic processing portion 23 sends a notification to the security service provider 27 through the Internet 26 (or the mobile communication network 17). The server 4 rejects a request for reconnection from the disconnected mobile terminal device 5.

As described above, the onboard device 2 according to the present embodiment measures the received power of a radio wave transmitted from the base station 16 while the engine 19 is rotating. The onboard device 2 sets the outside-range approach flag when the received power goes lower than or equal to the outside-range approach level that indicates a possibility of being positioned in the outside range. It is supposed that the outside-range approach flag is set, the vehicle whose engine 19 stops reveals the radio wave environment to be outside range, and the key ID expiration date passes and needs to be updated. In this condition, the onboard device 2 permits the mobile terminal device 5 to acquire a new alternative expiration date for the key ID.

It is supposed that a person who intends to steal the vehicle beforehand acquires the smart key 3 and the registered mobile terminal device 5 and destroys the antenna of the vehicle parked in the inside range to escape the specifying of the vehicle position or the chase. In such case, it is difficult to update the expiration date using the mobile terminal device 5 because the outside-range approach flag is not set. Therefore, it may be possible to prevent an unauthorized attempt to allow the mobile terminal device 5 to acquire the expiration date by intentionally creating a situation of being in the outside range, prevent, and to enhance the security.

When the outside-range approach flag is not set in the situation, the onboard device 2 assumes the high security risk, inhibits communication with the mobile terminal device 5, and increases the detection sensitivity of the security ECU 20. Consequently, it may be possible to obtain a greater anti-theft effect. The outside-range approach flag is also transmitted to the server 4. The server 4 transmits the expiration date to the mobile terminal device 5 under condition that the outside-range approach flag is set. The security may be more enhanced.

The onboard device 2 measures the received power of a radio wave transmitted from the base station 16 even while the engine 19 stops. At this time, the received power may be subject to a change that exceeds the permissible value $\Delta Pm1$ since the antenna is destroyed or the vehicle is transported to the outside range. Since the onboard device 2 assumes the high security risk and increases the sensitivity of the security ECU 20, it may be possible to obtain a greater anti-theft effect.

The vehicle anti-theft system imposes further conditions on the vehicle positioned in the outside range when the mobile terminal device 5 is used to acquire the expiration date from the server 4. The onboard device 2 stores the received power data and vehicle speed data while the outside-range approach flag is set and the engine 19 is rotating. The mobile terminal device 5 permitted to acquire the expiration date also measures the received power and the movement speed and stores the data. The server 4 receives these pieces of data and transmits the expiration date to the mobile terminal device 5 under the condition that the travel distance of the onboard device 2 in an outside-range area approximately matches the moving distance of the mobile terminal device 5 until positioned to the inside range. For example, it is supposed that the antenna is destroyed during the travel while the engine 19 operates. In this case, a difference between the distances occurs, it may be possible to prevent the update.

Based on the received power data and the vehicle speed data, the onboard device 2 calculates the distance traveled after being positioned in the outside range. The mobile terminal device 5 permitted to acquire the expiration date displays the calculated distance. Accordingly, it may be possible that the authorized user to understand the moving distance until being positioned in the inside range, and that the convenience increases. Further, the onboard device 2 specifies the transportation by walking when the distance until being positioned to the inside range is less than or equal to a predetermined value (for example 2 km). The server 4 transmits the expiration date to the mobile terminal device 5 under the condition that the movement speed is lower than or equal to a movement speed by walking.

The onboard device 2 specifies the minimal required time instead of the transportation form when the distance until being positioned to the inside range exceeds the predetermined value. The server 4 transmits the expiration date to the mobile terminal device 5 under the condition that the required time is longer than or equal to the minimal required time. Since the key ID is not updated in a short time using the mobile terminal device 5, it may be possible to obtain further anti-theft effects such as discouraging the vehicle theft.

While there has been described the preferred embodiment of the present disclosure, the disclosure is not limited to the above-mentioned embodiment but may be otherwise variously modified or enhanced within the spirit and scope of the disclosure.

The onboard device 2 does not necessarily require the determination process at S2. It is possible to omit the process of transmitting the outside-range approach flag at S13 and the determination process at U9. The vehicle anti-theft system 1 does not necessarily require the following processes: transmitting and receiving the received power; measuring, transmitting, and receiving the vehicle speed and the movement speed; calculating the travel distance and the moving distance; the process on the server 4 at U3 through U8 concerning the determination about the transportation form and the minimal required time; and the related processes on the onboard device 2 and the mobile terminal device 5.

The abnormal security mode at S22 may allow a horn to output the alarm sound, turn on a headlight, or inhibit the engine from starting.

The onboard device 2 may store the measured received power and/or the outside-range approach flag in the storage portion 13 instead of the storage portion 15.

The power unit is not limited to the engine 19 but may be provided as a motor. In other words, the onboard device and the vehicle anti-theft system according to the disclosure are applicable not only to automobiles using an engine as a motor, but also hybrid automobiles, electric automobiles, and two-wheel vehicles.

What is claimed is:

1. A vehicle onboard device comprising:
   a vehicular communicator configured to communicate with a server through a mobile communication network and measuring received power of a radio wave transmitted from a base station of the mobile communication network;
   a collation controller configured to store a key information that is required to be updated in each expiration date and providing a start permission that changes a power unit of a vehicle from a stopped state to an operating state when a received key information that has been transmitted from an apparatus other than the vehicle and is received by the vehicle onboard device is collated with the key information stored in the collation controller and the received key information is matched with the key information stored in the collation controller, and when the key information satisfies an expiration date; and
   a short range communicator of the vehicle configured to perform short range communication with a mobile terminal device, the mobile terminal device being registered in advance in the collation controller and communicable with the server through the mobile communication network, wherein
   during an operation of the power unit, the collation controller sets an outside-range approach flag when the received power measured by the vehicular communicator is equal to or less than a near-marginal level, and the collation controller resets the outside-range approach flag when the received power is higher than the near-marginal level, the near-marginal level is set higher than a marginal level by a predetermined permissible value, the marginal level corresponding to a minimum received power level required for communication between the base station of the mobile communication network and the vehicular communicator, during a stopping of the power unit, the collation controller permits the mobile terminal device to communicate with the server and to acquire a key information update information when the vehicular communicator is positioned in an outside range being incapable of a communication between the vehicular communicator and the base station of the mobile communication network, the key information needs to be updated, and the outside-range approach flag is set, and the collation controller receives the key information update information acquired from the mobile terminal device through the short range communicator and updates the key information.

2. The vehicle onboard device according to claim 1, wherein the collation controller determines that a security risk is high when the key information needs to be updated in the outside range and the outside-range approach flag is reset while the power unit stops, and the collation controller inhibits the short range communicator from communicating with the mobile terminal device.

3. The vehicle onboard device according to claim 1, wherein the collation controller determines that a security risk is high when the received power measured by the vehicular communicator decreases from a value higher than the near-marginal level to a value equal to or lower than the marginal level or increases from a value equal to or lower than the marginal level to a value higher than the near-marginal level while the power unit stops.

4. The vehicle onboard device according to claim 2, wherein the collation controller increases a sensitivity of a security device mounted to the vehicle when the collation controller determines that the security risk is high.

5. A vehicle anti-theft system comprising:

a server connected to a mobile communication network;

the vehicle onboard device according to claim 1 that is communicable with the server through the mobile communication network; and a mobile terminal device registered in advance and communicable with the server through the mobile communication network and capable of short range communication with the vehicle onboard device, wherein the mobile terminal device receives key information update information from the server when the vehicle onboard device permits the mobile terminal device to communicate with the server and to acquire the key information update information and the mobile terminal device is positioned in an inside range capable of communication with a base station of the mobile communication network, and the mobile terminal device transmits the key information update information to the vehicle onboard device.

6. The vehicle anti-theft system according to claim 5, wherein a collation controller of the vehicle onboard device transmits an outside-range approach flag to the server while a power unit operates, and the server transmits the key information update information to the mobile terminal device when the outside-range approach flag is set.

7. The vehicle anti-theft system according to claim 5, wherein a collation controller of the vehicle onboard device stores a received power data measured by a vehicular communicator of the vehicle onboard device and a vehicle speed data while the power unit operates and an outside-range approach flag is set, the collation controller transmits the stored received power data and the stored vehicle speed data to the mobile terminal device when the collation controller permits the mobile terminal device to acquire the key information update information while the power unit stops, the mobile terminal device measures received power of a radio wave transmitted from the base station of the mobile communication network and measures a movement speed, stores a received power data and a movement speed data measured from a time when a permission is given until a time when the mobile terminal device communicates with the server, and transmits a data to the server, the data including the received power data and the vehicle speed data measured by the vehicle onboard device, and the received power data and the movement speed data measured by the mobile terminal device, the server calculates a travel distance traveled after the vehicle onboard device is positioned in an outside range based on the received power data and the vehicle speed data measured by the vehicle onboard device, the server calculates a moving distance traveled after the mobile terminal device is positioned in the inside range based on the received power data and the movement speed data measured by the mobile terminal device, and the server transmits the key information update information to the mobile terminal device when a difference between the travel distance and the moving distance is equal to less than an allowable value.

8. The vehicle anti-theft system according to claim 7, wherein the collation controller of the vehicle onboard device calculates the travel distance traveled after the vehicle onboard device is positioned in the outside range based on the received power data and the vehicle speed data measured by the vehicle onboard device, the collation controller transmits the calculated travel distance to the mobile terminal device when the collation controller permits the mobile terminal device to acquire the key information update information, and the mobile terminal device notifies the received travel distance as the moving distance to the inside range.

9. The vehicle anti-theft system according to claim 8, wherein the collation controller of the vehicle onboard device specifies a transportation form for a user carrying the mobile terminal device to move to the inside range according to the calculated travel distance, the collation controller of the vehicle onboard device transmits the transportation form to the mobile terminal device, the mobile terminal device receives the transportation form used for moving, and notifies a message indicating the transportation form used for moving, and the server transmits the key information update information to the mobile terminal device when the movement speed measured by the mobile terminal device is evaluated as speed of the specified transportation form according to the travel distance traveled after the vehicle onboard device is positioned in the outside range.

10. The vehicle anti-theft system according to claim 8, wherein the collation controller of the vehicle onboard device specifies a minimal required time in moving to the inside range by a user carrying the mobile terminal device, the collation controller of the vehicle onboard device transmits the minimal required time to the mobile terminal device, the mobile terminal device notifies the minimal required time when the mobile terminal device receives the minimal required time, and the server transmits the key information update information to the mobile terminal device when a time from when the vehicle onboard device permits the mobile terminal device to acquire the key information update information until communication with the server is equal to or longer than the minimal required time.

* * * * *